United States Patent

Caporusso et al.

[11] Patent Number: 5,493,889
[45] Date of Patent: Feb. 27, 1996

[54] COUPLING BETWEEN THE CONTROLLING AND ACTUATING MEMBER AND THE WORKING HEAD OF A PORTABLE PIPE BENDING MACHINE

[75] Inventors: Alessandro Caporusso; Mario Caporusso, both of Frosinone, Italy

[73] Assignee: C.M.L. Costruzioni Meccaniche LIRI S.r.l., Piedimonte San Germano, Italy

[21] Appl. No.: 188,801

[22] Filed: Jan. 31, 1994

[30] Foreign Application Priority Data

Jan. 29, 1993 [IT] Italy ................ RM93A0044

[51] Int. Cl.⁶ .................. B21D 9/05; B21D 7/00
[52] U.S. Cl. .............. 72/389.8; 72/149; 72/383; 72/453.14; 403/236; 403/338
[58] Field of Search ............... 72/383, 387, 389, 72/453.15, 453.16, 457, 149; 403/399, 398, 387, 338, 258, 236; 29/276, 212, 213, 453.14; 92/161; 384/434

[56] References Cited

U.S. PATENT DOCUMENTS

| | | |
|---|---|---|
| 2,560,413 | 7/1951 | Carlson ................ 384/434 |
| 3,018,818 | 1/1962 | Swanson ................ 72/213 |
| 3,231,298 | 1/1966 | Tomb et al. ................ 403/338 |
| 3,848,450 | 11/1974 | Dehlbam et al. ................ 72/389 |
| 3,908,425 | 9/1975 | Ware ................ 72/389 |
| 4,141,235 | 2/1979 | Ishihara ................ 72/383 |
| 4,811,589 | 3/1989 | Caporusso et al. ................ 72/213 |
| 4,838,831 | 6/1989 | Rumberger ................ 403/338 |

Primary Examiner—Lowell A. Larson
Assistant Examiner—Rodney A. Butler
Attorney, Agent, or Firm—Young & Thompson

[57] ABSTRACT

A coupling between the piston and cylinder controlling and actuating member and the bending head of a portable pipe bending machine comprising a collar (5) made up of two half collars (5', 5") with concavities complementary with the side wall of the cylinder (3), which are removably joined (6, 6') to each other to clamp the cylinder itself, one of them (5') being rigidly joined (6, 6') to the bending head (1), a coupling which is desired further comprises structure for preventing the axial displacement of the collar (5) upon the cylinder (3), particularly a groove (9', 9") on the collar and a complementary ridge (9) on the cylinder (3).

7 Claims, 1 Drawing Sheet

5,493,889

COUPLING BETWEEN THE CONTROLLING AND ACTUATING MEMBER AND THE WORKING HEAD OF A PORTABLE PIPE BENDING MACHINE

FIELD OF THE INVENTION

The present invention relates to a coupling between the controlling and actuating member and the working head of a portable pipe bending machine.

BACKGROUND OF THE INVENTION

As is known to those who are skilled in the art, a portable pipe bending machine is made up of two fundamental parts. The first one is a piston actuating member operated with hydraulic, pneumatic or mechanical manual control means, if desired assisted by an electric motor. Specifically, a piston is provided, mounted within an oleodynamic cylinder with a handle control. The second part is the working member, that is to say the bending or curving head. It comprises a matrix with a groove that receives the pipe to be bent, which matrix is made to advance linearly or it is made to rotate with the pipe in its groove, bending the pipe itself against the rest of two shoulders. The actuation of the matrix is carried out by exploiting the displacements of the aforementioned piston, transforming them into angular advances with suitable mechanisms in the case of a rotating matrix.

In the earliest pipe bending apparatuses the two aforementioned parts, that for controlling and that for bending, were connected in a fixed manner. This, however, was uncomfortable for the operator, in that the controlling handle was not always in a position of easy manoeuvrability, once the bending head was positioned for the operation.

Then, this drawback was obviated by providing a coupling that was turnable perpendicularly to the axis of the actuating piston, in order to be able to have the handle always in the position of best manoeuvrability for the operator.

The turnable couplings known heretofore are ball couplings. They allow a relative rotation of the hydraulic cylinder, with which the handle is integral, and of the bending head, connected to the cylinder with a mouthpiece neck interfaced through a ball device.

However, ball couplings suffer from the drawback of being not fixable once the optimum angular position of the handle has been found, though affording a certain stability. That is to say, the handle during the bending operation, is subjected to displacements from the optimum position.

The object of the present invention is to obviate such a drawback.

SUMMARY OF THE INVENTION

Such an object is achieved by means of a coupling which comprises a collar made up of two half collars with concavities complementary to the side wall of the cylinder of the actuating member, which half collars are removably joined to each other to clamp the cylinder itself, one of them being rigidly joined to the bending head of the pipe bending apparatus.

Advantageously, it is further provided for it that it comprises means for preventing the axial displacement of the collar upon the cylinder.

According to a preferred embodiment, such means for preventing the axial displacement of the collar upon the cylinder are made up of complementary grooves and ridges provided on the cylinder and on the collar.

In a particularly preferred embodiment, a ridge is provided on the cylinder and a groove is provided on the collar, or vice-versa.

In a preferred embodiment a mutual coupling play is provided between the two aforementioned half collars.

According to a preferred embodiment, the removable joining means between the two half collars are screws.

In a particularly preferred embodiment, the screws are mounted across the body of the bending head passing through the half collar joined to the bending head without gripping it, gripping the other half collar and with their heads abutting against the body of the bending head.

According to an embodiment of the present invention, the half collar joined to the body of the bending head is integral with the body itself of the bending head.

The advantage afforded by the present invention is that the operator can fix the hydraulic cylinder with which the handle is integral in the desired angular position relative to the bending head and then need not give further attention thereto, as the cylinder body and the bending head are integral with each other.

BRIEF DESCRIPTION OF THE DRAWING

The present invention will be best understood on the basis of the following disclosure of its preferred embodiment, given only as a matter of example, absolutely not of restriction, with reference to the annexed drawing, wherein.

DETAILED DESCRIPTION OF THE PREFERRED EMBODIMENT

Figure 1:
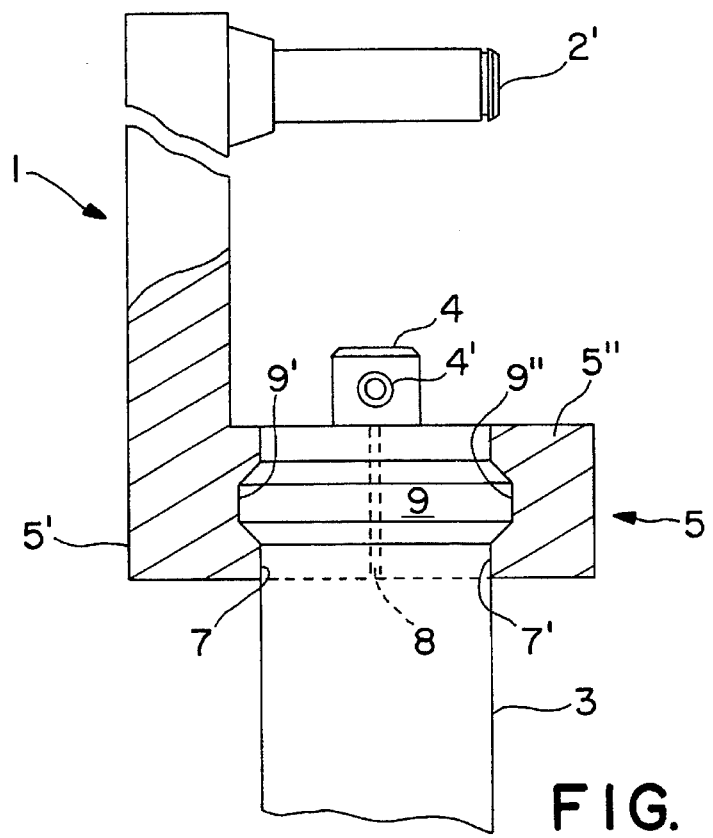
FIG. 1 is a side view, partially sectioned, of the pipe bending apparatus with the coupling according to the present invention.
Figure 2:
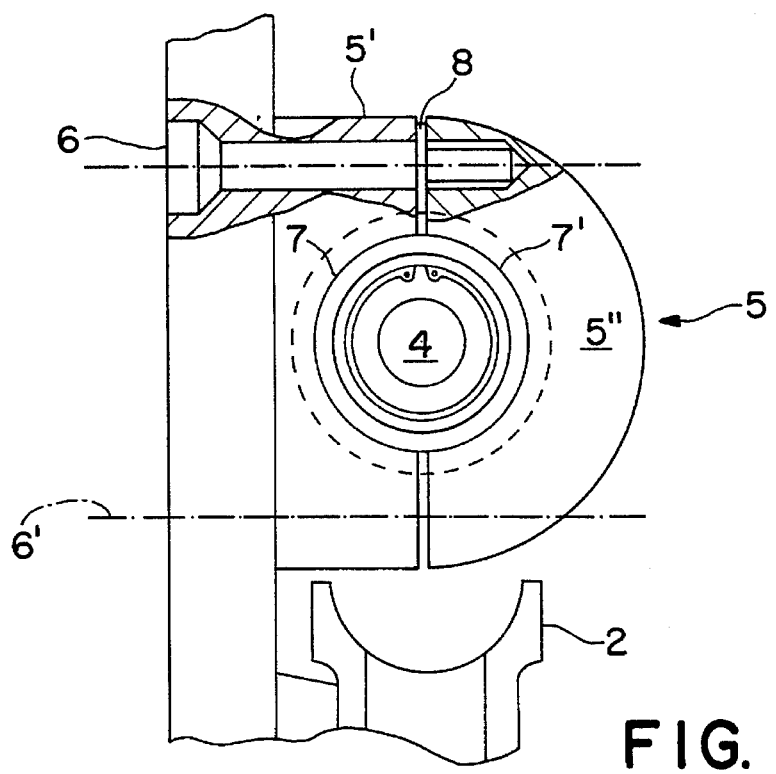
FIG. 2 is a partially sectioned top view of the same.

The bending head of the portable pipe bending apparatus is indicated with the general reference number 1. It is exemplified in the so-called fork type, with two grooved shoulders intended to operate with a half-moon matrix. It also has a groove, that advances linearly between the two grooved shoulders, which are arranged symmetrically to the axis of its displacements, and idling on respective pins. A portion of a shoulder 2 and a support pin 2' are shown in the figures.

The cylinder or neck of the controlling and actuating member is indicated with the reference number 3. A piston 4, at the extremity whereof the aforementioned groove matrix (not shown) is fitted with the interface of a spring loaded ball 4' provided on the piston itself, slides in it.

The coupling is indicated with the general reference number 5. It comprises a piece 5' provided at the base of the bending fork 1, whereto it is rigidly joined. The piece 5' has a cavity having a circular section 7 of almost 180° cross section that mates with the outer wall of the cylinder 3. Moreover, the joint comprises a piece 5", to be fixed onto the piece 5', it also has a cavity having a circular section 7 of almost 180° cross section that mates with the outer wall of the cylinder 3. The pieces 5', 5" are joined to each other to form a collar that clamps the cylinder 3 at its interior. The negative deviation from the straight angle of the cross section of the cavity of the two pieces 5', 5" provides the needed play 8 between these.

In the preferred embodiment shown in the drawing, the collar is tightened and kept joined to the bending head by means of two screws 6, 6', which pass through two corresponding bores in the piece 5' and screw into the piece 5", the heads abutting against the body of the bending head itself.

As the coupling is subjected to high axial stresses during bending operations, complementary axial abutment means are provided on the surfaces 7, 7' of the two pieces 5', 5" and on the side surface of the cylinder 3. They consist for instance of a transverse ridge 9 on the cylinder 3 and of corresponding grooves 9', 9" on the surfaces 7, 7'.

The present invention has been disclosed and depicted with reference to a specific embodiment thereof, but it is to be expressely understood that changes, additions and/or omissions can be made, without departing from the relevant protection scope, defined by the appended claims.

For instance, the axial abutment means could also be comprised of a groove on the cylinder and of corresponding ridges on the two parts of the collar, or also of a plurality of grooves and/or ridges on the cylinder and corresponding ridges and/or grooves on the collar.

We claims:

1. A portable pipe bending apparatus having a piston and cylinder controlling an actuating member, said apparatus also comprising a working head, the working head being integral with a collar made up of two half collars which together removably clamp between them the cylinder, whereby loosening of the two half collars from the cylinder enables the two half collars and with them the working head to be rotated about the cylinder to a convenient working position.

2. The coupling according to claim 1, wherein a ridge is provided on the cylinder and a complementary groove is provided on the collar.

3. The coupling according to claim 1, wherein a groove is provided on the cylinder and a ridge is provided on the collar.

4. The coupling according to claim 1, wherein a gap is provided between the two half collars when the two half collars are secured together to clamp the cylinder between them.

5. The coupling according to claim 1, wherein removable joining means between the two half collars are provided which are screws.

6. The coupling according to claim 5, wherein the screws are screwed through the body of the bending head, pass through the half collar joined to the bending head without gripping the same and are screwed into the other half collar, with respective heads that abut against the body of the bending head.

7. A portable pipe bending machine bending head which comprises integrally with itself a half collar of the coupling according to claim 1.

\* \* \* \* \*